Dec. 15, 1953
E. L. MORAGNE
2,662,607
ROTATING BED ADSORBER
Filed July 22, 1950
4 Sheets-Sheet 1
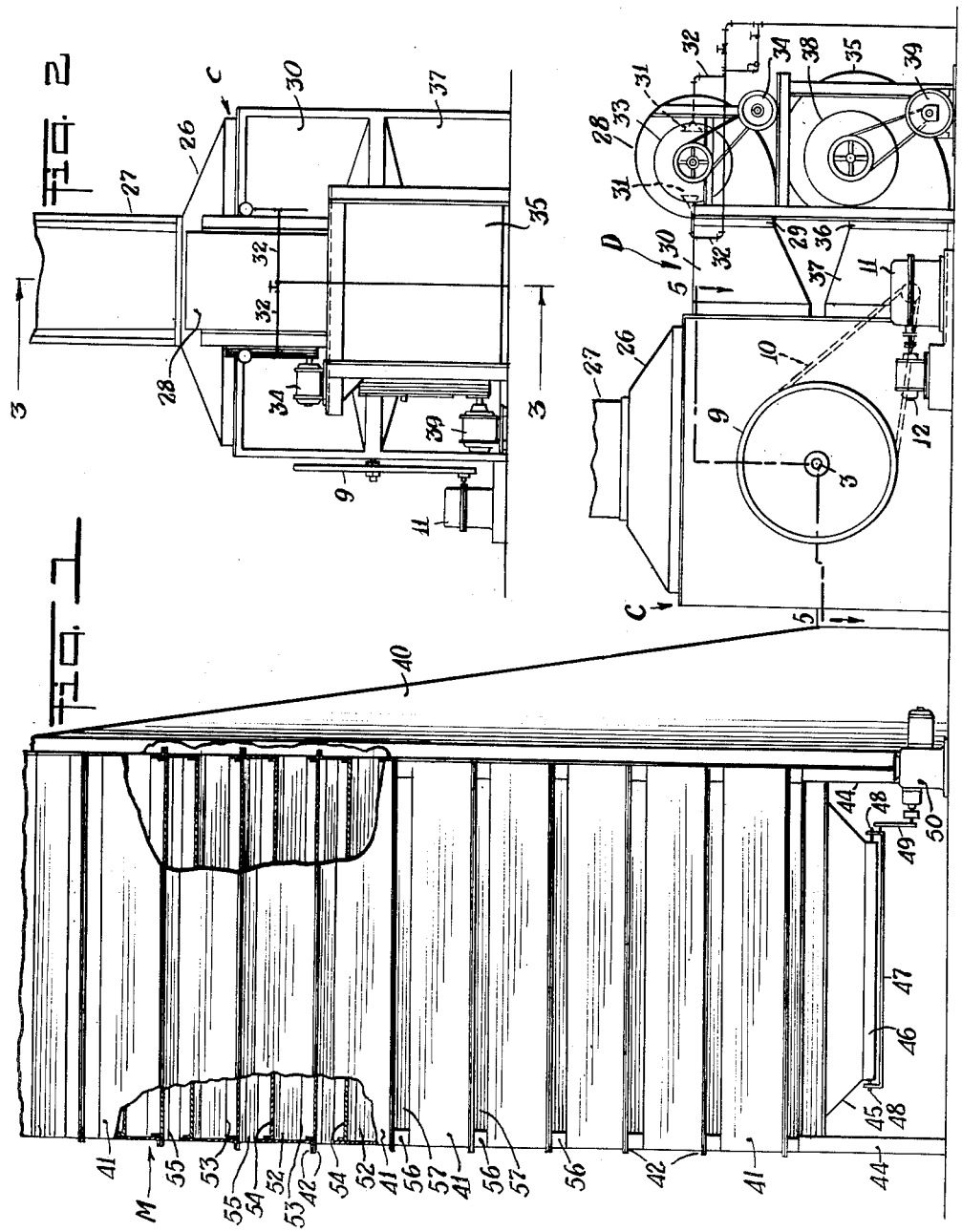
INVENTOR.
Edward L. Moragne
BY
ATTORNEY

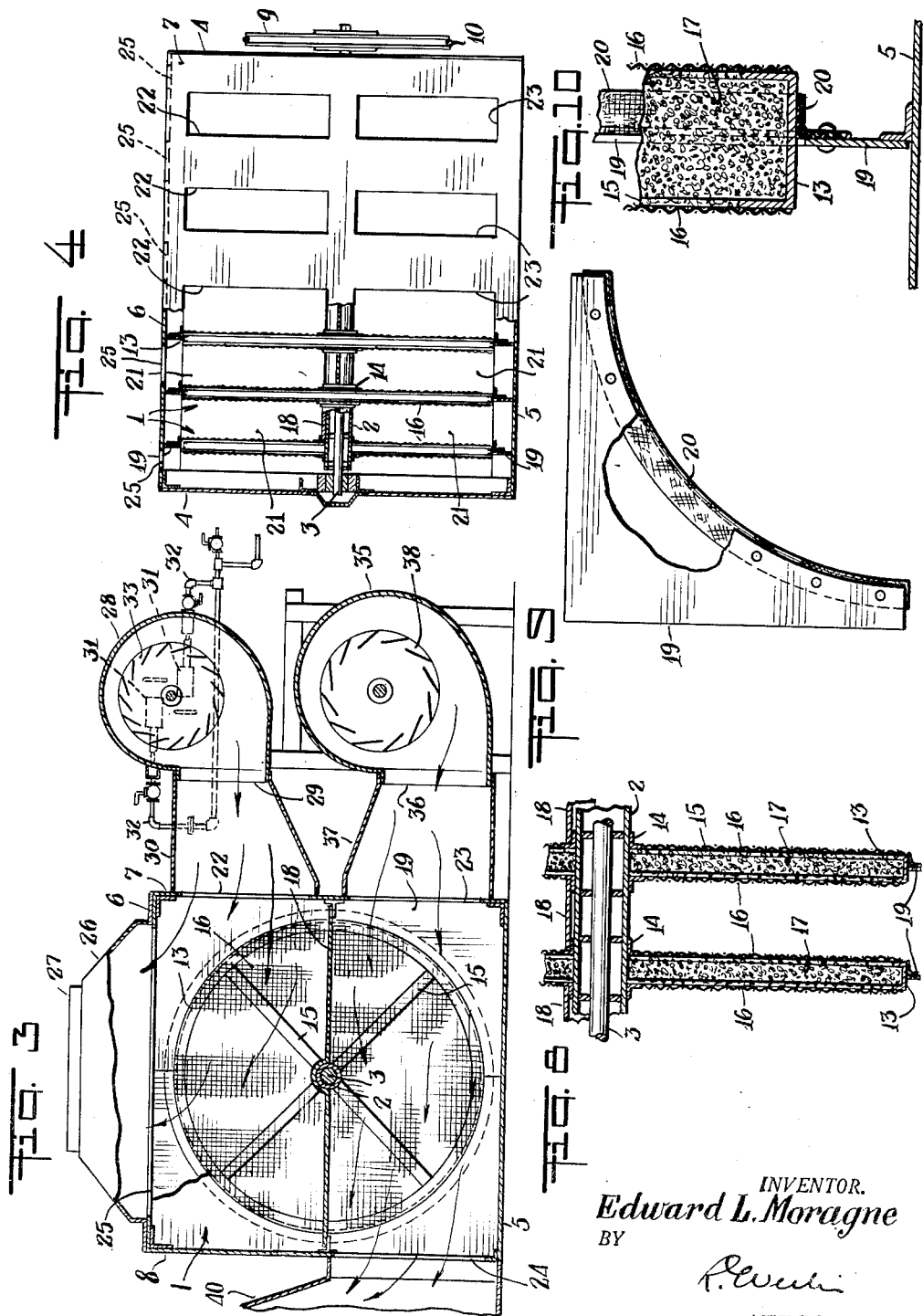

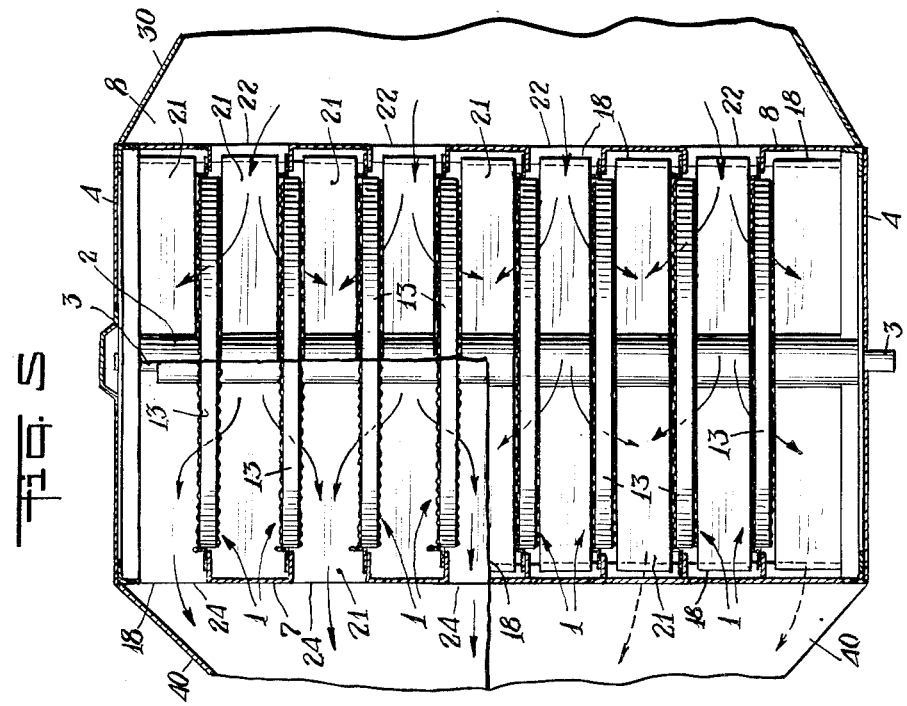
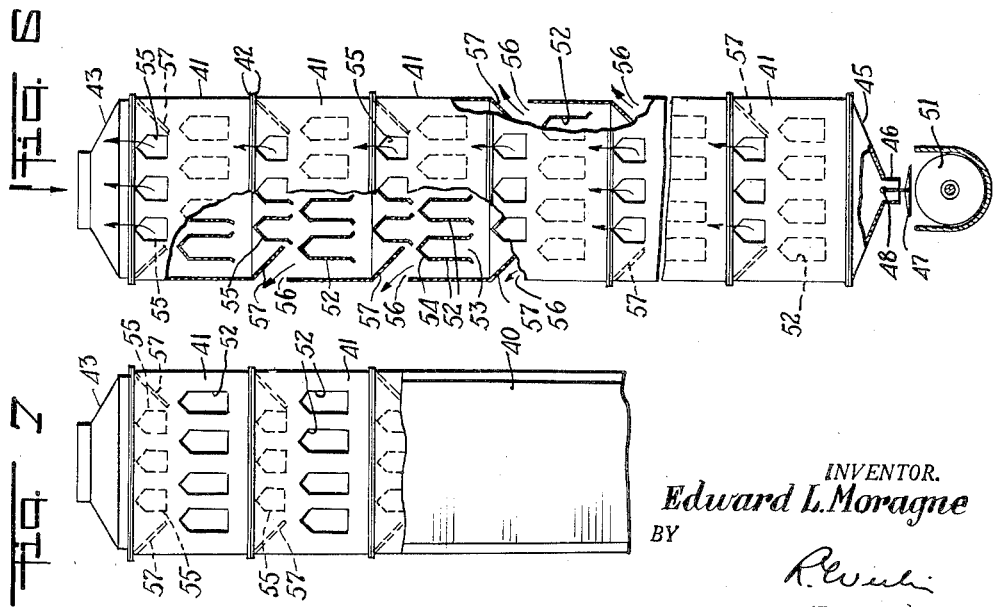

Dec. 15, 1953
E. L. MORAGNE
2,662,607
ROTATING BED ADSORBER
Filed July 22, 1950
4 Sheets-Sheet 4
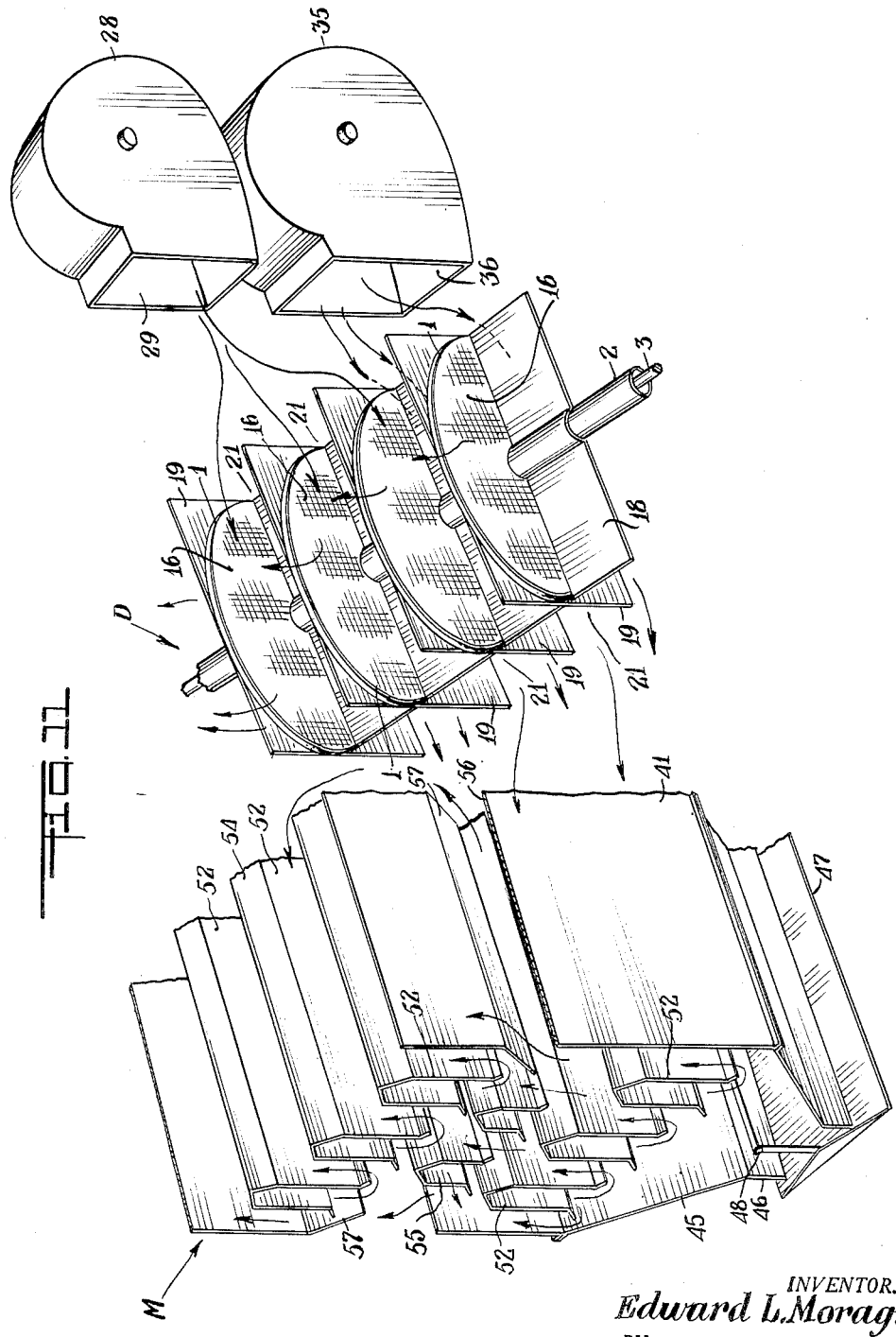
INVENTOR.
*Edward L. Moragne*
BY
ATTORNEY Patented Dec. 15, 1953

2,662,607

UNITED STATES PATENT OFFICE 2,662,607

ROTATING BED ADSORBER

Edward L. Moragne, Houston, Tex., assignor of one-third to Milton J. Guiberteau and one-third to Herbert L. Reynolds, both of Houston, Tex.

Application July 22, 1950, Serial No. 175,312

3 Claims. (Cl. 183—4.6)

This invention relates to a drying apparatus. More particularly the invention is applicable with special advantage to the drying of grains, especially field or "paddy" rice, which, when harvested, normally contain an excess of moisture which must be removed to permit safe storage and to protect the grain against deterioration thereof prior to milling. It will be understood that the invention is well adapted for much wider application to many other materials, although for purposes of illustration of its principles, the invention will be described specifically in its application to the drying of rice.

Generally stated, the invention has for its primary object the provision of an apparatus comprising means for passing a stream of heated air into intimate contact with a rotating body of a solid desiccant to dehydrate and to heat the desiccant; means for rotating the dried and heated desiccant body into contact with a separate stream of atmospheric air to dehydrate the latter and to raise its temperature; and means for passing the so-dried and heated air into direct and intimate contact with a moving body of the grain or other material to be dried to remove or reduce the moisture content of such material.

The invention has for its principal objects the provision of dehydrating apparatus which comprises a combined desiccant drying and air heating section, including unique features of construction and operation, which will be described in detail hereinafter.

Other and more specific objects and advantages of this invention will become apparent from the following detailed description when read in conjunction with the accompanying drawings which illustrate one useful embodiment in accordance with this invention.

In the drawings:

Fig. 1 is a side elevation of an assembly of the principal elements constituting the drying system in accordance with one embodiment of this invention, some of the parts being broken away for purposes of better illustration;

Fig. 2 is an end elevational view of the desiccant drying and air heating section of the system;

Fig. 3 is a sectional side view of the desiccant drying and air heating section taken generally along line 3—3 of Fig. 2;

Fig. 4 is an elevational view of the air inlet side of the rotary desiccant and air drying structure, having parts of the enclosing casing and interior parts broken away;

Fig. 5 is a top cross-sectional view of the rotary drier structure taken generally along line 5—5 of Fig. 1;

Fig. 6 is an elevational view of one end of the material drying section having some of the parts thereof broken away;

Fig. 7 is a partial elevational view of the opposite end of the material drying section having some of the parts thereof broken away;

Fig. 8 is a fragmentary sectional view of the rotary desiccant dryer;

Fig. 9 is a side view of one of the corner baffle plates enclosing the periphery of the rotary dryer segments;

Fig. 10 is an enlarged fragmentary end view in section of one of the rotary dryer elements; and Fig. 11 is a skeletonized perspective view of the drying system as a whole illustrating generally the flow of air therethrough.

Referring to the drawings, the desiccant drying and air heating section is designated generally by the letter D and the material drying section or dryer by the letter M.

Section D includes a rotary dryer composed of a plurality of circular hollow drums, designated generally by the numerals 1, axially spaced apart along a hollow horizontally disposed sleeve 2 to which the drums are rigidly affixed so as to be rotatable therewith. A drive shaft 3 extends through the bore of sleeve 2 and is rigidly affixed to the sleeve by means of spacer rings 4, whereby shaft 3, sleeve 2 and drums 1 form a unitary rotatable structure. This rotatable structure is enclosed within a generally rectangular box-like casing, designated generally by the letter C, which is composed of end-walls 4—4, a bottom wall 5, top wall 6, and side walls 7 and 8. The ends of shaft 3 are suitably journalled in end walls 4, one end of the shaft 3 extending through one of the end walls and has mounted thereon a pully 9 which is connected by a driving belt 10 to a suitable driving means, such as a gear box 11 and motor 12, whereby the dryer may be rotated at an appropriate speed.

Each of the drums 1 is formed by a narrow outer rim 13 and a hub 14, connected by a plurality of radial spokes or braces 15. The side walls of the drum are formed by suitable screens 16, of a mesh size such as to confine within the interior of the drum a body of solid granular desiccant 17 of any appropriate and well-known character which is adapted to absorb moisture from a gasiform fluid passing therethrough.

A series of horizontal partition plates 18 extend transversely of casing C between side walls 7 and 8 and through the spaces between the several pairs of drums 1, whereby to form a horizontal partition across the interior of the casing generally diametrically of the several drums 1 and extending throughout the length of casing C. With this arrangement, a half-section of the drums will extend above the partition and the other half section below the partition during rotation of the drums. The spaces between rims 13 and the surrounding walls of casing C are closed by filler plates 19 (see Figs. 9 and 10 particularly) which are suitable affixed at their outer edges to the surrounding walls of casing C. The inner edges of plates 19 are curved to fit closely about the outer periphery of rims 13 and flexible gaskets 20 are fastened to the inner edges of plates 19 and arranged to press against rims 13 to thereby form seals between the inner edges of plates 19 and the outer peripheries of the drums, which will, at the same time, permit free rotation of the drums relative to plates 19. With this arrangement, filler plates 19 together with drums 1 provide a plurality of longitudinally spaced-apart vertical partitions throughout casing C and co-operate with horizontal plates 18 to define series of compartments 21 above and below the horizontal partition formed by plates 18 between the pairs of drums 1. Communication between these several compartments above and below partition plates 18 is provided through the segments of drums 1 extending on opposite sides of partition plates 18.

Side wall 8 is provided with laterally spaced, vertically aligned upper and lower series of rectangular openings 22 and 23, respectively, openings 22 being located above the level of partition plates 18, and openings 23 below the level of partition plates 18. Openings 22 and 23 are spaced so as to communicate with alternate ones of the compartments 21 (see Figs. 4 and 5 particularly). Side wall 7 is provided with only one series of laterally spaced openings 24 which communicate with those compartments 21 which are below partition plates 18 and which are intermediate those in communication with openings 23 in side wall 8. Top wall 6 is provided with a series of openings 25 (Fig. 4) which provide communication with the upper series of compartments 21 intermediate those in communication with openings 22. Openings 25 communicate with a hood 26 which, in turn, communicates with a flue 27.

A centrifugal blower 28, of any suitable and generally conventional design, has its discharge 29 connected by means of a duct 30 to upper series of openings 22 in casing C, and is equipped with burners 31—31 adapted to burn any suitable type of fuel, preferably natural gas, supplied through pipes 32—32, and to discharge the products of combustion into the suction 33 of blower 28 to mix with air drawn into the blower suction from the atmosphere. Blower 28 is driven by means of a motor 34. A second centrifugal blower 35, of larger capacity than blower 28, has its discharge 36 connected by means of a duct 37 to the lower series of openings 23 in casing C, and is provided with the usual suction opening 38 for drawing atmospheric air into the blower. Blower 35 is driven by means of a motor 39. Openings 24 are connected by means of a duct 40 to one end of material dryer M, which will be described in detail hereinafter.

Dryer M is composed of a series of superimposed contactor sections which are substantially identical in construction, each being constructed in the form of a generally rectangular hollow casing 41 which is adapted to be horizontally disposed and is provided with flanges 42 about its upper and lower edges, by means of which the contactor sections may be arranged in a vertical stack of any desired number. The casings 41 are open at their upper and lower ends so that when arranged in a vertical stack, a continuous open passage is afforded throughout the full height of dryer M. The material to be dried is introduced into the upper end of dryer M, which may be provided with a hopper or distributor 43 for this purpose, or the material may simply be poured into the open upper end by any conventional means such as the usual bucket elevator (not shown). The stack of contactor sections comprising dryer M will be supported on any suitable arrangement of supporting legs 44—44, so that the lower end of the dryer will be somewhat elevated above a supporting base. A hopper 45, is connected to the lower end of lowermost one of the contactor sections and is provided with a mouth 46 of generally rectangular shape. A flat plate type gate 47 is swingably arranged below mouth 46 and is pivoted at its ends on a pivot rod 48 mounted in the walls of mouth 46. A crank 49 connects gate 47 to a motor 50 by which the gate may be swung from side-to-side below mouth 46 so that material falling downwardly through hopper 45 and on the upper surface of gate 47 will slide off of the gate as it swings from side-to-side and will discharge into any suitable and generally conventional removal means, such as a screw conveyer 51 (Fig. 6) by means of which the material may be conveyed to any suitable disposal point.

Interiorly each of the casings 41 is provided with a plurality of generally rectangular, laterally spaced, parallel conduits 52 which extend throughout the length of the casing and which open at one end through one end wall of the casing into communication with duct 40. The opposite end of each of the conduits 52 is closed and each conduit is open at its lower end throughout its length, as at 53, to the interior of the casing, the upper ends of the conduits being closed by an upwardly extending angular or domed wall 54. Each of the casings 41 is provided with a second row of conduits 55, of the same general configuration, but of somewhat smaller height than conduits 52. Conduits 55 are arranged above conduits 52 and in staggered relation thereto, as best shown in Figs. 6 and 7. The ends of conduits 55 adjacent duct 40 are closed and their opposite ends open through the opposite end wall of casing 41 to the exterior of dryer M. Each of the casings 41 is provided adjacent its upper edges and on opposite sides thereof with slots 56—56. A baffle wall 57 extends downwardly and inwardly of the interior of the casings 41 from the upper edges of slots 56.

The above described apparatus operates in the following manner: With drums 1 filled with desiccant 17 and rotating continuously, a stream of atmospheric air will be delivered by blower 35 through duct 37 to openings 23 in compartments 21 below partitions 18. This air will pass generally axially through the desiccant in the portions of drums 1 below partition 18. The desiccant will have been dried and heated in a manner to be subsequently described, before being contacted by the air from blower 35, and the air in passing through the so dried and heated desiccant will, in turn, be dried and heated to the desired temperature by its intimate contact with the desiccant. The dried and heated air then discharges through openings 24 into duct 40 and thence through conduits 52 in dryer M. The grain or other material to be dried will be introduced into the upper end of dryer M entering the uppermost one of the contactor sections and flowing by gravity downwardly to the lower end of the dryer and discharging from hopper 45 into screw conveyor 51. As the material falls downwardly it will come in contact with the heated, dry air which will emerge through the open lower ends 53 of the several conduits in the several contactor sections and will flow upwardly along and between the walls of the several conduits and will thereby be uniformly distributed through the body of material moving downwardly in the same general path. The resulting intimate counter-current contact of the down-flowing moisture-containing material with the heated dry air will cause the latter to absorb moisture from the down-flowing material so that the latter will be dried to the requisite degree by the time it descends to hopper 45. By means of this arrangement employing a plurality of superimposed contactor sections, each having several conduits 52, means is provided for admitting a plurality of streams of dried and heated air at a plurality of vertically and laterally spaced points along the path of descent of the material to be dried and thereby assures highly effective drying action on the descending material. The air emerging from the open bottoms of conduits 52 in each of the contactor sections works its way up through the material passing downwardly through that section. The major portion of the air thus entering each of the contactor sections discharges from the same section to the atmosphere, a part discharging through the side slots 56 and a part entering the open bottoms of conduits 55 and discharging from the open ends of the latter. With this arrangement, a relatively large discharge area for the air in each section is provided, thereby obviating any substantial resistance by the air to the free downward flow of the material being dried. The form and staggered arrangement of the several conduits 52 and 55 provides an effective baffling arrangement to assure uniform distribution and intimate contact between the air and the material to be dried.

Returning now to the desiccant drying and heating operation. Contemporaneously with the previously described movement of the stream of air by blower 35 through the desiccant to dryer M, a second stream of air will be drawn into blower 28 where it is heated by the products of combustion generated by burners 31 and mixed therewith in the suction of blower 28. This stream of air will thus be heated to any suitable temperature necessary to remove from desiccant 17 the moisture which will have been absorbed by the desiccant in its contact with the air from blower 35, and to also heat the desiccant to such a temperature as will provide the quantity of heat required by the air stream going to dryer M. The so heated air will be discharged by blower 28 through duct 30, thence through openings 22 into the portions of compartments 21 above partition 18. This heated air will pass through the desiccant in the segments of drums 1 which extend above partition 18 and by intimate contact therewith will remove from the desiccant the moisture which it has absorbed from the air stream flowing beneath partition 18 to dryer M. At the same time, a sufficient amount of heat will be transferred to the desiccant for subsequent heating of the air stream going to dryer M. The air, after passing through the segments of drums 1 above partition 18, will discharge upwardly through hood 26 into flue 27. Since drums 1 are kept in continuous rotation it will be seen that the steps of drying and heating the air going to the dryer and of then drying the desiccant for further contact with additional quantities of fresh air, constitutes a continuous operation and provides a method whereby a relatively small quantity of desiccant may be employed to very effectively heat and dry large volumes of air as may be needed in dryer M. By providing a plurality of narrow annular bodies of desiccant and the rotating drum arrangement described and illustrated, both air streams may be brought into contact with the desiccant bodies in a plurality of parallel streams, whereby high heat transfer rates and minimum pressure drops are provided throughout the system, thereby providing both efficient drying and heating of one air stream and, simultaneously, efficient dehydration and heating of the desiccant by the other air stream.

The relative volumes of the air streams may be regulated in any suitable and conventional manner and the temperatures of both air streams may be regulated largely merely by appropriate regulation of burners 31.

The above-described method and apparatus may be employed for drying numerous types of materials, particularly grains. It is especially applicable to the drying of field or "paddy" rice under conditions which will remove the requisite amount of moisture without danger of overheating and thereby damaging the grain.

In the case of "paddy" rice, present practice has been to directly contact the moisture-containing rice with a mixed stream of air and products of combustion employed to heat the air. Such a stream necessarily contains the water formed by combustion of the fuel and that initially contained in the atmospheric air which varies, of course, with natural humidity conditions. Accordingly, in conventional systems, the drying is relatively inefficient and subject to local overheating, and, therefore, normally requiring repeated recycling of the grain. This is very undesirable, as rice may not be heated above a relatively low temperature without causing embrittlement of the grain with consequent cracking of the grain in subsequent handling and milling operations, which greatly reduces the market value of the grain. By the present method all such difficulties are eliminated, as the efficient heating and drying arrangement described permits rice to be dried to the requisite degree in a single pass through the dryer section and the drying is accomplished at a low temperature well below any point at which embrittlement is likely to occur. The drying capacity of a system of a given size will be relatively large, thereby also greatly reducing the equipment and operating costs, as compared with more conventional systems.

As one specific example of the application of the method of the present invention to the drying of rice, air at a temperature only about 5 to 10° F. above the ambient temperature of the atmospheric air was employed. To produce suitably dry air at this temperature, the air stream supplied by blower 28 was heated to a temperature of about 400° F.

It will be understood that numerous alterations and modifications may be made in the details of the illustrative embodiment within the scope of the appended claims but without departing from the spirit of this invention. For example, it will be understood that instead of employing a plurality of the desiccant drums 1, a single drum may be employed without departing from the principles of this invention, although this may entail some sacrifice in efficiency in steps employed in drying and heating air going to the dryer and in dehydrating and heating the desiccant. Similarly, other designs may be employed for dryer M in combination with novel desiccant and air drying and heating structure herein described.

What I claim and desire to secure by Letters Patent is:

1. Apparatus for conditioning a fluid medium such as air and the like, comprising, a shaft, means for rotating said shaft, a plurality of generally annular drums having perforate ends axially spaced along said shaft and rotatable therewith, a body of granular desiccant material confined within each of said drums, a casing enclosing all of said drums, sealing means for sealing between the periphery of each of said drums and said casing, partition means comprising plate members extending transversely of said casing between each pair of said drums and generally diametrically thereof into sealing engagement with the opposite walls of said casing to thereby define two series of compartments on opposite sides of said partition means enclosing separate segments of said drums and their confined bodies of desiccant materials, the compartments of each series communicating with each other through the ends of the segments of said drums enclosed within the respective compartments, alternate compartments of each of said series having inlet openings and the intervening compartments of each of said series having discharge openings, separate air-supply conduits connected to said inlet openings of each of said series of compartments, and separate air discharge conduits connected to said discharge openings of each of said series of compartments.

2. In apparatus as defined in claim 1, blower means connected to each of said air-supply conduits for supplying streams of air thereto, and heating means for heating one of said streams of air.

3. Apparatus as defined in claim 1, wherein said sealing means comprises annular flexible sealing elements mounted on the walls of said casing and extending therefrom into circumferential sealing engagement with the peripheries of said drums.

EDWARD L. MORAGNE.

References Cited in the file of this patent

UNITED STATES PATENTS

| Number | Name | Date |
|---|---|---|
| 870,546 | Cooke | Nov. 12, 1907 |
| 1,028,899 | Morris | June 11, 1912 |
| 1,685,338 | Randolph | Sept. 25, 1928 |
| 1,814,028 | Egli | July 14, 1931 |
| 1,912,784 | Miller et al. | June 6, 1933 |
| 2,115,226 | Kopp | Apr. 26, 1938 |
| 2,190,168 | Armistead | Feb. 13, 1940 |
| 2,499,328 | Pawlansky | Feb. 28, 1950 |
| 2,499,411 | Pennington | Mar. 7, 1950 |